United States Patent
Kim

(10) Patent No.: US 12,092,192 B2
(45) Date of Patent: Sep. 17, 2024

(54) ECCENTRICITY PREVENTION DEVICE FOR PUMPING DEVICE

(71) Applicant: HYUNDAI TRANSYS INC., Seosan-si (KR)

(72) Inventor: Won Kim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 18/246,875

(22) PCT Filed: Jun. 17, 2021

(86) PCT No.: PCT/KR2021/007619
§ 371 (c)(1),
(2) Date: Mar. 28, 2023

(87) PCT Pub. No.: WO2022/075552
PCT Pub. Date: Apr. 14, 2022

(65) Prior Publication Data
US 2023/0366455 A1    Nov. 16, 2023

(30) Foreign Application Priority Data

Oct. 8, 2020    (KR) .......................... 10-2020-0130125

(51) Int. Cl.
*F16H 21/40*    (2006.01)
*B60N 2/16*    (2006.01)

(52) U.S. Cl.
CPC .............. *F16H 21/40* (2013.01); *B60N 2/167* (2013.01); *B60N 2/168* (2013.01)

(58) Field of Classification Search
CPC ......... F16H 21/40; B60N 2/167; B60N 2/168; B60N 2/1635
See application file for complete search history.

(56) References Cited

U.S. PATENT DOCUMENTS

2009/0184554 A1*  7/2009  Paing .................... B60N 2/167
                                                            417/313
2009/0272613 A1*  11/2009  Kawai ................... B60N 2/167
                                                            192/45.01

FOREIGN PATENT DOCUMENTS

| JP | 2004338426 A | 12/2004 |
| JP | 2012067792 A | 4/2012 |
| KR | 100956729 B1 | 5/2010 |
| KR | 20180045428 A | 5/2018 |
| KR | 10-1947534 B1 | 2/2019 |

* cited by examiner

*Primary Examiner* — Terence Boes
(74) *Attorney, Agent, or Firm* — Bridgeway IP Law Group, PLLC; Jihun Kim

(57) ABSTRACT

The present invention relates to an eccentricity prevention device for a pumping device, which reduces an eccentric movement of an internal component due to an external force while reducing a free movement of a pumping lever, the eccentricity prevention device including a lever bracket coupled to the pumping lever, a housing having a clutch device provided therein and coupled to a position facing the lever bracket by the clutch device, and an elastic member elastically supported on the lever bracket while providing an elastic restoring force in a direction in which an eccentric movement of the clutch device being bent with respect to a rotation axis is canceled.

7 Claims, 3 Drawing Sheets

ECCENTRICITY PREVENTION DEVICE FOR PUMPING DEVICE

TECHNICAL FIELD

The present invention relates to an eccentricity prevention device for a pumping device, which reduces an eccentric movement of an internal component due to an external force while reducing a free movement of a pumping lever.

BACKGROUND ART

A pumping device refers to a device installed in a seat to allow a person seated in the seat to manually adjust a height of a seat cushion to a height suitable for a body type of the person.

When the person seated in the seat manipulates a pumping lever, which is installed on a lateral surface of the seat cushion, clockwise or counterclockwise, an operating force of the pumping lever is transmitted to a link mechanism through the seat pumping device, and the seat cushion is moved upward or downward depending on a direction in which the pumping lever is manipulated, such that the height of the seat cushion is adjusted.

A configuration of the pumping device will be briefly described. The pumping device includes a lever bracket integrally coupled to the pumping lever and configured to rotate, a housing having a drum shape and installed in the seat cushion, a clutch device accommodated in the housing and configured to rotate by receiving a rotational force, which is provided from the pumping lever, from the lever bracket, a brake device configured to block reversely inputted torque and maintain an adjusted height of the seat cushion; and a housing cover coupled to one side of the housing and configured to cover the housing.

In the case of the pumping device, the pumping lever and the lever bracket are integrally coupled. Therefore, when a force is applied to the pumping lever in a transverse direction, the lever bracket is also rotated, which makes it difficult to maintain a gap formed between the lever bracket and the housing to a predetermined level.

That is, the large gap causes a problem in that the amount of clearance of the pumping lever increases. Further, the small gap causes a problem in that friction occurs between components, an operating force increases or operational noise and abnormal noise occur, which causes a problem with quality.

Moreover, rotation axes of the clutch device and the brake device, which rotate together with the lever bracket, are eccentrically arranged, which causes a problem in that the components provided in the housing are caught by an inner wall surface of the housing, and a clearance occurs between the internal components.

As the related art, there is KR 10-1947534 B.

The foregoing explained as the background is intended merely to aid in the understanding of the background of the present invention, and is not intended to mean that the present invention falls within the purview of the related art that is already known to those skilled in the art.

DISCLOSURE

Technical Problem

The present invention has been made in an effort to solve the above-mentioned problem, and an object of the present invention is to provide an eccentricity prevention device for a pumping device, which reduces an eccentric movement of an internal component due to an external force while reducing a free movement of a pumping lever.

Technical Solution

To achieve the above-mentioned object, the present invention provides an eccentricity prevention device for a pumping device, the eccentricity prevention device including: a lever bracket coupled to a pumping lever; a housing having a clutch device provided therein and coupled to a position facing the lever bracket by the clutch device; and an elastic member elastically supported on the lever bracket while providing an elastic restoring force in a direction in which an eccentric movement of the clutch device being bent with respect to a rotation axis is canceled.

A through-hole may be formed in one surface of the housing that faces the lever bracket, and the elastic member may be provided between an inner surface of the housing and the clutch device and supported on the lever bracket while penetrating the through-hole.

The elastic member may include: a clutch support portion having a wave shape in a circumferential direction and provided between the inner surface of the housing and the clutch device; and a bracket support portion protruding toward the lever bracket from the clutch support portion and configured to penetrate the through-hole.

One surface of the clutch support portion may be supported on an inner surface of a cylindrical drum part provided at a center of the housing, the other surface of the clutch support portion may be supported on a rim surface of a clutch drum provided to surround the clutch device, the rim surface of the clutch drum may face the inner surface of the drum part, one end of the bracket support portion may be fixed to one surface of the clutch support portion, and the other end of the bracket support portion may be supported on the lever bracket facing the housing.

One surface of the clutch support portion may be in contact with the inner surface of the drum part while being disposed on the same plane as the inner surface of the drum part, and the other surface of the clutch support portion may be in contact with the rim surface of the clutch drum while being disposed on the same plane as the rim surface of the clutch drum.

A convex portion of one surface of the clutch support portion may be in line contact with the inner surface of the drum part, and a convex portion of the other surface of the clutch support portion may be in line contact with the rim surface of the clutch drum.

The bracket support portion may protrude in a 'U' shape, and a protruding portion provided at a middle portion of the bracket support portion may be in surface contact with the lever bracket.

Advantageous Effects

According to the technical solution of the present invention, the elastic member reduces operational noise and abnormal noise caused by friction between the rotary component and the stationary component when the pumping device operates, which makes it possible to improve quality and operating performance of the product and more stably perform the pumping operation.

MODE FOR INVENTION

Figure 1:
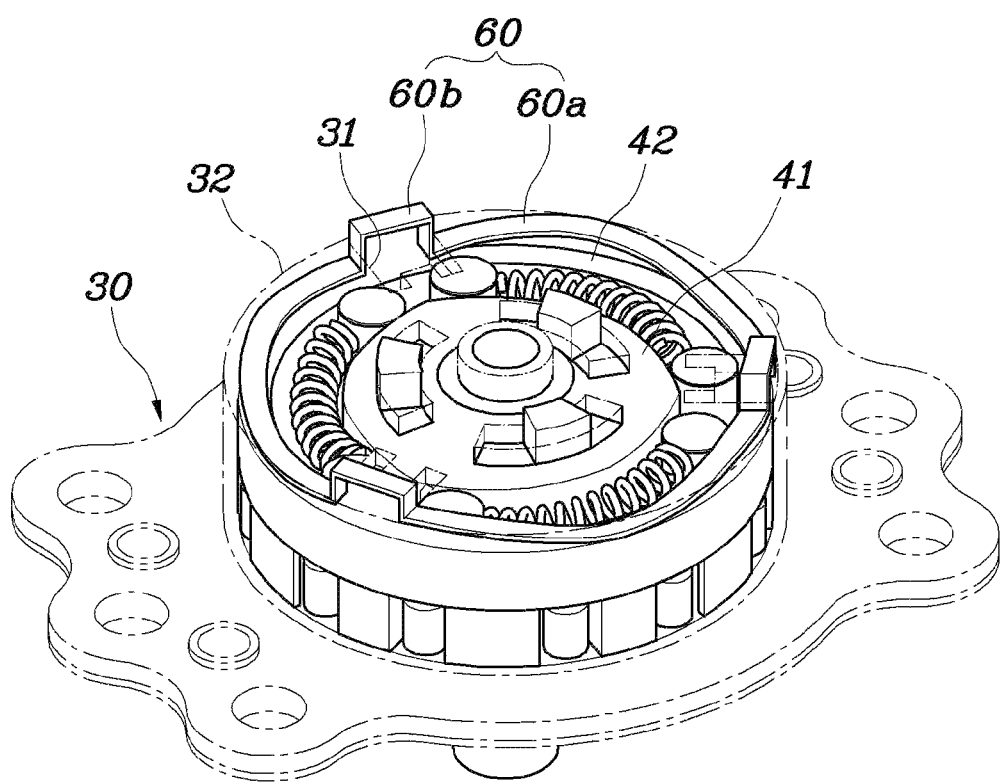
FIG. 1 is a view illustrating a configuration in which an elastic member is provided in a pumping device according to the present invention.

Hereinafter, exemplary embodiments of the present disclosure will be described in detail with reference to the accompanying drawings.

A pumping device of the present invention includes a housing 30 fixed to a seat cushion (not illustrated), and a clutch device 40 provided in the housing 30.

Further, a lever bracket 20 is fixed to a clutch cam 41 that constitutes the clutch device 40, and a pumping lever 10 is coupled to the lever bracket 20, such that the clutch device 40 is rotated by a rotation of the pumping lever 10.

Further, a brake device 50 is provided in the housing 30, and a pinion 51 is coupled to the brake device 50, such that a rotational force transmitted to the clutch device 40 is outputted through the pinion 51 and moves a seat upward or downward.

However, because the description of specific configurations of the clutch device 40 and the brake device 50 and the description of a pumping operation using these components are publicly-known technologies, the specific descriptions thereof will be omitted.

Figure 2:
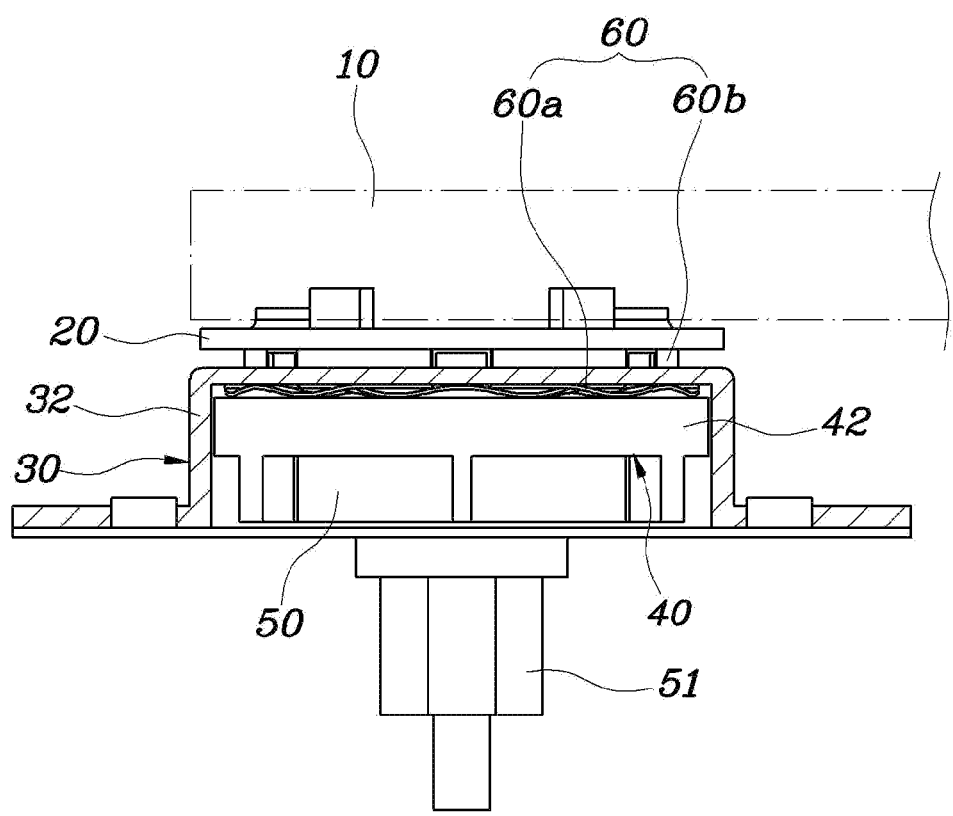
FIG. 2 is a view for explaining a coupling relationship of the elastic member according to the present invention.

Meanwhile, FIG. 1 is a view illustrating a configuration in which an elastic member 60 is provided in the pumping device according to the present invention, and FIG. 2 is a view for explaining a coupling relationship of the elastic member 60 according to the present invention.

The distinctive technical configuration of the present invention will be specifically described with reference to the drawings. The pumping device includes: the lever bracket 20 coupled to the lever; the housing 30 having the clutch device 40 provided therein and coupled to a position facing the lever bracket 20 by the clutch device 40; and the elastic member 60 elastically supported on the lever bracket 20 while providing an elastic restoring force in a direction in which an eccentric movement of the clutch device 40 being bent with respect to a rotation axis is canceled.

That is, because the pumping lever 10 and the lever bracket 20 are fastened to each other by bolting or the like, the lever bracket 20 rotates when the pumping lever 10 performs a pumping operation. Therefore, even in case that a force is applied to the pumping lever 10 in a transverse direction, the lever bracket 20 freely moves leftward and rightward, such that rotation axes of the lever bracket 20, the clutch device 40, and the brake device 50 are bent and eccentrically arranged.

Therefore, in the present invention, the elastic member 60 is used to provide the elastic restoring force to the clutch device 40 in a direction opposite to the direction in which the clutch device 40 is bent and eccentrically arranged, which prevents the rotation axis of the clutch device 40 from being eccentrically arranged. Therefore, the rotation axes of the clutch device 40, the brake device 50, and the pinion 51 are coaxially disposed, which prevents the clutch device 40, the brake device 50, and the pinion 51 from being eccentrically arranged.

In particular, the elastic member 60 supports the lever bracket 20 that freely moves leftward and rightward, such that the lever bracket 20 performs the pumping operation while directly generating friction with the elastic member 60.

Therefore, it is possible to reduce operational noise and abnormal noise caused by friction between the rotary component and the stationary component when the pumping device operates, which makes it possible to improve quality and operating performance of the product and more stably perform the pumping operation.

Further, as illustrated in FIGS. 1 and 2, a through-hole 31 may be formed in one surface of the housing 30 that faces the lever bracket 20. The elastic member 60 may be provided between an inner surface of the housing 30 and the clutch device 40 and supported on the lever bracket 20 while penetrating the through-hole 31.

For example, a cylindrical drum part 32 may be provided at a center of the housing 30, and three through-holes 31 may be formed along a periphery of the drum part 32 and disposed at equal angles.

Further, the elastic member 60 may be provided in the drum part 32, and the elastic member 60 is partially directed toward the lever bracket 20 through the through-holes 31. Therefore, the elastic member 60 is supported on the lever bracket 20 as the elastic member 60 partially passes through the through-holes 31.

For reference, the through-hole 31 is provided in the form of a quadrangular hole. A length of the through-hole 31 in a horizontal width direction of the through-hole 31 may correspond to or be longer than a length of the elastic member 60 in a width direction of the elastic member 60 that penetrates the through-hole 31.

Figure 3:
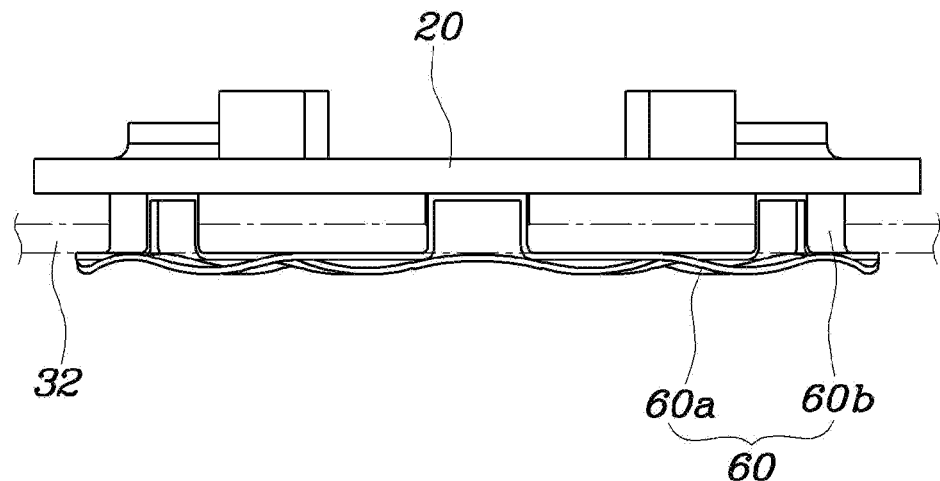
FIG. 3 is a view illustrating a lever bracket and the elastic member according to the present invention.
Figure 4:
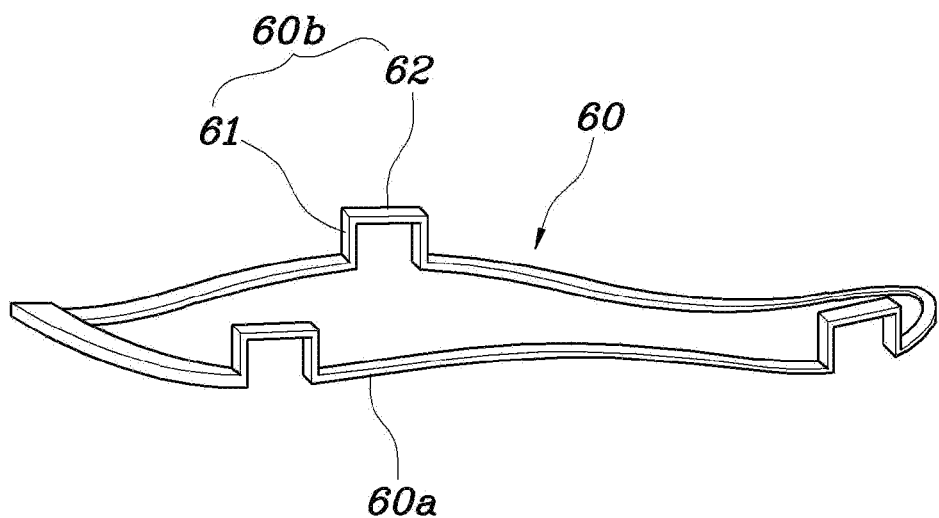
FIG. 4 is a perspective view illustrating the elastic member according to the present invention.

FIG. 3 is a view illustrating the lever bracket 20 and the elastic member 60 according to the present invention, and FIG. 4 is a perspective view illustrating the elastic member 60 according to the present invention.

The elastic member 60 will be more specifically described with reference to the drawings. The elastic member 60 includes: a clutch support portion 60a having a wave shape in a circumferential direction thereof and provided between the inner surface of the housing 30 and the clutch device 40; and bracket support portions 60b protruding from the clutch support portion 60a toward the lever bracket 20 and configured to penetrate the through-holes 31.

For example, the clutch support portion 60a is provided in the form of a wavy washer having a ring structure having a wave shape. The clutch support portion 60a is provided between the inner surface of the drum part 32 and the clutch device 40.

Further, the bracket support portions 60b are disposed along the clutch support portion 60a and formed at positions corresponding to the through-holes 31. The bracket support portion 60b penetrates the through-hole 31 to the outside.

Therefore, the clutch support portion 60a provides an elastic restoring force in a direction opposite to the direction in which the components, such as the clutch device 40 and the brake device 50 in the housing 30, are bent and eccentrically arranged. Further, the bracket support portions 60b support the lever bracket 20, such that the lever bracket 20 performs the pumping operation while directly generating friction with the elastic member 60.

Further, referring to FIG. 2, the clutch support portion 60a has a structure in which one surface thereof is supported on an inner surface of the cylindrical drum part 32 provided at the center of the housing 30, and the other surface thereof is supported on a rim surface of a clutch drum 42 provided to surround the clutch device 40. The rim surface faces the inner surface of the drum part 32.

Further, the bracket support portion 60b has a structure in which one end thereof is fixed to one surface of the clutch support portion 60a, and the other end thereof is supported on the lever bracket 20 facing the housing 30.

The bracket support portion 60b protrudes in a 'U' shape, and a protruding portion provided at a middle portion of the bracket support portion 60b is in surface contact with the lever bracket 20.

That is, the clutch support portion 60a is supported between the drum part 32 and the clutch drum 42 and inhibits an eccentric movement of the clutch drum 42, thereby preventing the internal components from being eccentrically arranged with respect to the rotation axis of the clutch device 40.

In addition, the bracket support portion 60b has leg portions 61 formed at two opposite ends thereof, and the leg portions 61 are integrated with the clutch support portion 60a. A connection portion 62 is formed between the leg portions 61, such that the connection portion 62 is in surface contact with a surface of the lever bracket 20 that faces the housing 30.

Further, as illustrated in FIG. 3, one surface of the clutch support portion 60a may be in contact with the inner surface of the drum part 32 while being disposed on the same plane as the inner surface of the drum part 32. The other surface of the clutch support portion 60a may be in contact with the rim surface of the clutch drum 42 while being disposed on the same plane as the rim surface of the clutch drum 42.

Therefore, the two opposite surfaces of the clutch support portion 60a are in uniform contact with the drum part 32 and the clutch drum 42, which increases a support area. Therefore, the components in the housing 30 are more stably supported.

Therefore, a convex portion of one surface of the clutch support portion 60a may be in line contact with the inner surface of the drum part 32, and a convex portion of the other surface of the clutch support portion 60a may be in line contact with the rim surface of the clutch drum 42.

That is, because the clutch support portion 60a is formed in a wave shape, the convex portion of one surface of the clutch support portion 60a is supported while being in line contact with the inner surface of the drum part 32, and the convex portion of the other surface of the clutch support portion 60a is supported while being in line contact with the rim of the clutch drum 42.

Therefore, it is possible to prevent stress from being concentrated on particular portions of the drum part 32 and the clutch drum 42, thereby improving component durability.

With this configuration, in case that the lever bracket 20 is bent toward one side because of free leftward and rightward movements of the pumping lever 10, one side of the lever bracket 20 is eccentrically rotated toward the housing 30.

Then, the eccentric portion of the lever bracket 20 is supported by the bracket support portion 60b existing at the corresponding eccentric position, such that the lever bracket 20 is supported by the bracket support portion 60b, thereby inhibiting an excessive eccentric rotation of the lever bracket 20.

Further, the clutch drum 42 is also bent toward one side with respect to the rotation axis because of the free leftward and rightward movements of the pumping lever 10. In this case, the clutch drum 42 is bent toward the drum part 32 and pushes a part of the clutch support portion 60a positioned at the corresponding portion.

Then, the pushed portion is elastically restored by the elastic restoring force of the clutch support portion 60a, and the rotation axis of the clutch drum 42 is also restored to a state in which the rotation axis of the clutch drum 42 is not bent. Therefore, the rotation axes of the clutch device 40, the brake device 50, and the pinion 51 are coaxially disposed.

As described above, in the present invention, the elastic member 60 is used to provide the elastic restoring force to the clutch device 40 in a direction opposite to the direction in which the clutch device 40 is bent and eccentrically arranged, which prevents the rotation axis of the clutch device 40 from being eccentrically arranged. Therefore, the rotation axes of the clutch device 40, the brake device 50, and the pinion 51 are coaxially disposed, which prevents the clutch device 40, the brake device 50, and the pinion 51 from being eccentrically arranged.

In particular, the elastic member 60 supports the lever bracket 20 that freely moves leftward and rightward, such that the lever bracket 20 performs the pumping operation while directly generating friction with the elastic member 60.

Therefore, the elastic member 60 reduces operational noise and abnormal noise caused by friction between the rotary component and the stationary component when the pumping device operates, which makes it possible to improve quality and operating performance of the product and more stably perform the pumping operation.

While the present invention has been described with reference to the specific examples, it is apparent to those skilled in the art that various modifications and alterations may be made within the technical spirit of the present invention, and these modifications and alterations belong to the appended claims.

DESCRIPTION OF REFERENCE NUMERALS

10: Pumping lever
20: Lever bracket
30: Housing
31: Through-hole
32: Drum part
40: Clutch device
41: Clutch cam
42: Clutch drum
50: Brake device
51: Pinion
60: Elastic member
60a: Clutch support portion
60b: Bracket support portion
61: Leg portion
62: Connection portion

The invention claimed is:

1. An eccentricity prevention device for a pumping device, the eccentricity prevention device comprising:
a lever bracket coupled to a pumping lever;
a housing having a clutch therein and one surface of the housing disposed at a position between the lever bracket and the clutch; and
an elastic member elastically supported on the lever bracket while being configured to provide an elastic restoring force in a direction canceling an eccentric movement of the clutch in which the clutch is bent with respect to a rotation axis,
wherein the one surface of the housing has a through-hole, and a portion of the elastic member is configured to penetrate the through-hole of the housing.

2. The eccentricity prevention device of claim 1,
wherein the elastic member is disposed between an inner surface of the housing and the clutch and the portion of the elastic member is supported on the lever bracket.

3. The eccentricity prevention device of claim 2, wherein the elastic member comprises:
- a clutch support portion having a wave shape in a circumferential direction and disposed between the inner surface of the housing and the clutch; and
- a bracket support portion protruding toward the lever bracket from the clutch support portion and configured to penetrate the through-hole.

4. The eccentricity prevention device of claim 3,
wherein one surface of the clutch support portion is supported on an inner surface of a cylindrical drum part disposed at a center of the housing, another surface of the clutch support portion is supported on a rim surface of a clutch drum disposed to surround the clutch, and the rim surface of the clutch drum faces the inner surface of the cylindrical drum part, and
wherein one end of the bracket support portion is fixed to one surface of the clutch support portion, and another end of the bracket support portion is supported on the lever bracket facing the housing.

5. The eccentricity prevention device of claim 3,
wherein one surface of the clutch support portion is in contact with the inner surface of a cylindrical drum part while being disposed on a same plane as the inner surface of the cylindrical drum part, and another surface of the clutch support portion is in contact with a rim surface of a clutch drum while being disposed on a same plane as the rim surface of the clutch drum.

6. The eccentricity prevention device of claim 5,
wherein a convex portion of the one surface of the clutch support portion is in line contact with the inner surface of the cylindrical drum part, and a convex portion of the another surface of the clutch support portion is in line contact with the rim surface of the clutch drum.

7. The eccentricity prevention device of claim 3,
wherein the bracket support portion protrudes in a 'U' shape, and a protruding portion disposed at a middle portion of the bracket support portion is in surface contact with the lever bracket.

* * * * *